US012584057B2

(12) United States Patent
Dai et al.

(10) Patent No.: US 12,584,057 B2
(45) Date of Patent: Mar. 24, 2026

(54) GEOPOLYMER-BASED SUB-AMBIENT DAYTIME RADIATIVE COOLING COATING

(71) Applicant: THE HONG KONG POLYTECHNIC UNIVERSITY, Hong Kong (CN)

(72) Inventors: Jianguo Dai, Hong Kong (CN); Ning Yang, Hong Kong (CN)

(73) Assignee: The Hong Kong Polytechnic University, Hong Kong (CN)

( * ) Notice: Subject to any disclaimer, the term of this patent is extended or adjusted under 35 U.S.C. 154(b) by 397 days.

(21) Appl. No.: 18/358,407

(22) Filed: Jul. 25, 2023

(65) Prior Publication Data

US 2024/0026202 A1    Jan. 25, 2024

Related U.S. Application Data

(60) Provisional application No. 63/369,255, filed on Jul. 25, 2022.

(51) Int. Cl.
| | |
|---|---|
| *C09K 5/14* | (2006.01) |
| *C04B 12/00* | (2006.01) |
| *C04B 12/04* | (2006.01) |
| *C04B 14/06* | (2006.01) |
| *C04B 20/00* | (2006.01) |
| *C04B 22/14* | (2006.01) |
| *C04B 28/00* | (2006.01) |
| *C04B 111/00* | (2006.01) |
| *C04B 111/80* | (2006.01) |

(52) U.S. Cl.
CPC .............. *C09K 5/14* (2013.01); *C04B 12/005* (2013.01); *C04B 12/04* (2013.01); *C04B 14/062* (2013.01); *C04B 20/008* (2013.01); *C04B 22/142* (2013.01); *C04B 28/006* (2013.01); *C04B 2111/00508* (2013.01); *C04B 2111/80* (2013.01); *C04B 2201/32* (2013.01)

(58) Field of Classification Search
CPC ..... C04B 12/005; C04B 12/04; C04B 14/062; C04B 20/008; C04B 22/142; C04B 28/006; C04B 2111/00508; C04B 2111/80; C04B 2201/32; C04B 2111/00586; C09D 1/02; C09D 7/61; C09K 5/14
See application file for complete search history.

(56) References Cited

U.S. PATENT DOCUMENTS

| | | | | |
|---|---|---|---|---|
| 10,323,151 | B2 * | 6/2019 | Van Overmeere ..... | C09D 5/024 |
| 2021/0131708 | A1 * | 5/2021 | Dai ........................ | C08K 3/013 |
| 2023/0116730 | A1 * | 4/2023 | Meckler ................ | C09D 5/004 |

FOREIGN PATENT DOCUMENTS

| | | |
|---|---|---|
| CN | 108219172 A | 6/2018 |
| CN | 112538299 A | 3/2021 |
| CN | 114729206 A | 7/2022 |

OTHER PUBLICATIONS

Office Action of CN 202310918807.2 issued from the CNIPA on Jun. 10, 2025.
Guoliang Chen el. al., Robust Inorganic Daytime Radiative Cooling Coating Based on a Phosphate Geopolymer, ACS Applied Materials & Interfaces, 12(49), 54963-54971.

* cited by examiner

*Primary Examiner* — Anthony J Green
(74) *Attorney, Agent, or Firm* — S&F/WEHRW

(57) ABSTRACT

Sub-ambient daytime radiative cooling (SDRC) coating comprising: an alkali activated metakaolin, $BaSO_4$, and silica nanospheres, wherein the alkali activated metakaolin is prepared by reaction of metakaolin with an alkali activator comprising waterglass and a strong base selected from the group consisting of LiOH, NaOH, KOH, $Ca(OH)_2$, $Li_2O$ $Na_2O$, $K_2O$, CaO, and a mixture thereof, a coating formulation comprising the same, and a method of preparation and use thereof.

17 Claims, 9 Drawing Sheets

GEOPOLYMER-BASED SUB-AMBIENT DAYTIME RADIATIVE COOLING COATING

CROSS-REFERENCE TO RELATED APPLICATIONS

The present application claims priority from U.S. Provisional Patent Application No. 63/369,255, filed on Jul. 25, 2022, which is hereby incorporated by reference in its entirety.

TECHNICAL FIELD

The present disclosure relates to a sub-ambient daytime radiative cooling coating exhibiting good solar reflectance and infrared emissivity prepared from readily available metakaolin, a coating formulation comprising the same, and methods of use and preparation thereof.

BACKGROUND

In recent years, sub-ambient daytime radiative cooling (SDRC) technology has gained worldwide attention for its potential to cool a surface of an object below the ambient temperature under direct sunlight with zero energy consumption. SDRC can be achieved by engineering a surface with a high solar reflectance as well as a high emittance in the sky transparent window (infrared atmospheric window). Specifically, the earth is in an earth-space-sun three-body dynamic radiative heat exchange system. Assuming the sun and earth as black bodies, the earth's temperature in steady state is about 279 K. Actually, the average temperature of the earth's surface is much higher than 279 K, because the earth's radiation is blocked by the earth's surface atmosphere in most wavelength bands due to its low transmittance. The increase in greenhouse gases in the atmosphere further blocks the outward radiation, leading to global warming and extreme climates. Fortunately, the main transparent band of the atmosphere, which is so-called atmospheric window, ranging from 8 to 13 μm, coincides with the peak of blackbody radiation from objects at around 300K. Therefore, objects on the earth can radiate heat to outer space through this 'window' and be thus passively cooled down.

A breakthrough in SDRC technology was reported in which a sub-ambient cooling effect was achieved under direct sunlight using a planar photonic emitter. This emitter consisted of 7 stacking layers of $HfO_2$ and $SiO_2$ with varying thicknesses on top of a 200-nm-thick Ag mirror and a 750-μm-thick Si substrate. A high solar reflectance of 97% and selective emission over the atmospheric window were realized. However, the above photonic structure-based technology, as well as the other metamaterials developed in the following studies, may suffer from sophisticated micro-nano fabrication and the use of metallic back reflector that result in high cost, which may impede the large-scale applications.

Organic polymeric coatings have been then studied to promote the wider applications of DRC technology due to their ease in manufacturing, low cost, good spectral tunability and versatile functionality (e.g., through the use of various functional fillers). It is especially noteworthy that many polymers are characterized with functional groups that can facilitate sufficient infrared radiation in the atmospheric window and high transparency for the solar spectrum. Various strategies have been adopted to enhance the cooling performance of the polymeric DRC coatings: (1) to choose organic polymer matrices with molecular bonds including C—O, C—F, C—Cl, etc., to enable high emittance in the infrared atmospheric window; (2) to further enhance the infrared radiation through phonon resonance of $SiO_2$ microparticles; (3) to improve the solar reflectance through introducing functional fillers ($TiO_2$, $Al_2O_3$, $CaCO_3$, $BaSO_4$, ZnO, etc.) or hierarchical air pores; (4) to apply the modified organic polymer coatings on highly reflective metallic substrates.

In a 2021 development the whitest coating used the acrylic-based paint as the matrix and then modified it with high-volume $BaSO_4$ nanoparticles, achieving a solar reflectance of 98.1% and a sky window emissivity of 0.95. Applying this DRC coating onto a roof area of approximately 1,000 square feet was said to be able to generate 10 kilowatts of cooling power, making it an attractive alternative to air conditioning to cool buildings. A criticism on organic polymer coatings is that they originate mostly from non-renewable fossil resources and their fabrication may be involved with the emission of volatile organic compounds (VOC), which generate a negative impact on human health and environment. In addition, the ageing problems of organic materials are always a significant concern under various environmental and climatic conditions, such as UV radiation, elevated temperature, and moisture exposure as well as the fire.

Geopolymers are a new category of clinker-free (i.e., much reduced $CO_2$ emission during production) cementitious materials having a three-dimensional inorganic alumino-silicate network, which is composed of silicon oxygen tetrahedron $[SiO_4]^{4-}$ and aluminum oxygen tetrahedron $[AlO_4]^-$ bridged by silicon-aluminum-oxygen bonds. The high bond energies of the Si—O bond and the Al—O bond in the geopolymer structure make it hard to react with most acids at room temperature. Moreover, the dense nano-sized pores within the network leads to superior durability, chemical tolerance, and impermeability to other materials. Most importantly, the solar reflectance of metakaolin-based geopolymer itself is relatively high (over 70%), making it a good candidate for preparing the DRCC, as illustrated in FIG. 1.

There is thus a need to develop an improved SDRC coating that overcome at least some of the of the disadvantages described above.

SUMMARY

An objective of the present disclosure is the development of an environmentally friendly inorganic SDRC coating using geopolymers. The optical properties, including solar reflectance and infrared emissivity, of the geopolymer SDRC coating were characterized. In addition, the durability, abrasion resistance, and water resistance of the developed coating were also tested to meet the relevant industrial standards of coatings.

In a first aspect, provided herein is a sub-ambient daytime radiative cooling (SDRC) coating comprising: an alkali activated metakaolin, $BaSO_4$, and silica nanospheres, wherein the alkali activated metakaolin is prepared by reaction of metakaolin with an alkali activator comprising waterglass and a strong base selected from the group consisting of LiOH, NaOH, KOH, $Ca(OH)_2$, $Li_2O$ $Na_2O$, $K_2O$, CaO, and a mixture thereof.

In certain embodiments, the SDRC has a solar reflectance of 0.9667-0.9758 between 100-2,500 nm.

In certain embodiments, the SDRC has an infrared emissivity of 0.90-0.9491 between 8-13 μm.

In certain embodiments, the $BaSO_4$ is present in the coating at 50-70 wt %.

In certain embodiments, the $BaSO_4$ is present in the coating at 60-63 wt %.

In certain embodiments, the silica nanospheres have an average diameter between 10-100 nm.

In certain embodiments, the silica nanospheres have an average diameter between 20-50 nm.

In certain embodiments, the silica nanospheres are present in the coating at 0.5-2.0 wt %.

In certain embodiments, the silica nanospheres are present in the coating at 1.5-2.0 wt %.

In certain embodiments, the $BaSO_4$ is present in the coating at 60-63 wt % and the silica nanospheres are present in the coating at 1.5-2.0 wt %.

In certain embodiments, the alkali activator comprises waterglass comprising sodium silicate and NaOH in water.

In certain embodiments, the waterglass has a modulus of 1-5, respectively.

In certain embodiments, the metakaolin and the alkali activator are combined in a mass ratio of metakaolin to a solid content of the alkali activator of 1:1 to 1.2:1, respectively.

In certain embodiments, the SDRC coating further comprises one or more additives selected from the group consisting of polytetrafluoroethylene, $Ca(OH)_2$, $MgF_2$, $BaTiO_3$, light-weight lime, and ground lime.

In certain embodiments, the metakaolin is activated by reaction with an alkali activator, wherein the alkali activator comprises waterglass comprising sodium silicate and NaOH, the waterglass has a modulus of 3-3.5, the metakaolin and the alkali activator are combined in a mass ratio of metakaolin to a solid content of the alkali activator of 1:1 to 1.1:1, respectively;

the $BaSO_4$ is present in the coating at 60-63 wt %;

the silica nanospheres have an average diameter between 20-50 nm;

the silica nanospheres are present in the coating at 1.5-2.0 wt %; and the SDRC has an infrared emissivity of 0.93-0.9491 between 8-13 nm.

In a second aspect, provided herein is a sub-ambient daytime radiative cooling (SDRC) coating formulation comprising the SDRC coating of claim 1 and water.

In a third aspect, provided herein is a method of applying the SDRC coating formulation to a surface of a substrate, the method comprising: applying the SDRC coating formulation to the surface of the substrate thereby forming a SDRC coating on the surface of the substrate; and removing at least a portion of the water from the SDRC coating.

BRIEF DESCRIPTION OF THE DRAWINGS

The above and other objects and features of the present disclosure will become apparent from the following description of the disclosure, when taken in conjunction with the accompanying drawings.

4

Figure 3:
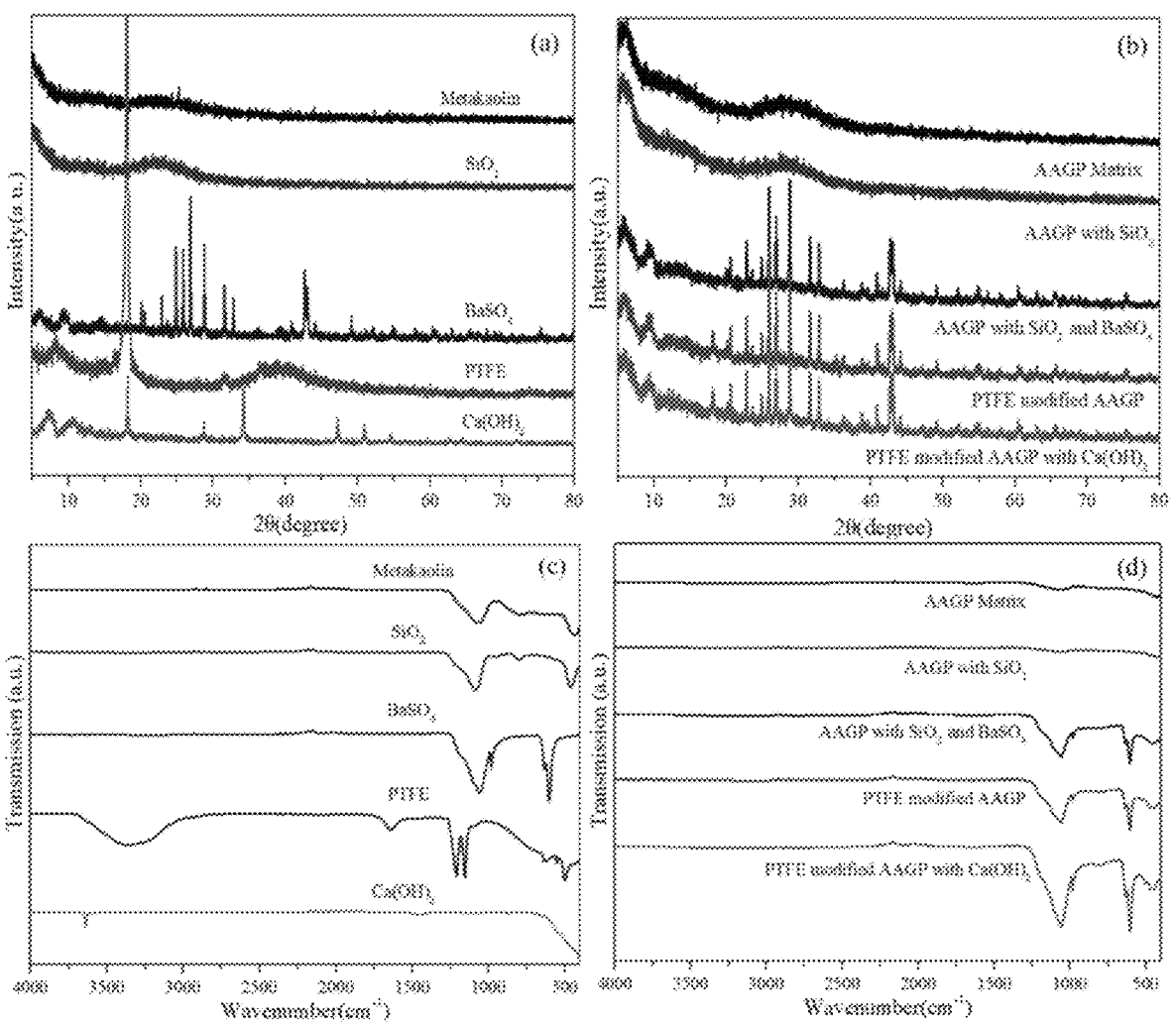

FIG. 3 depicts XRD of the raw materials (a) and AAGP coatings with different fillers (b). FTIR of the raw materials (c), AAGP matrix and AAGP coatings with different fillers (d).

Figure 4:
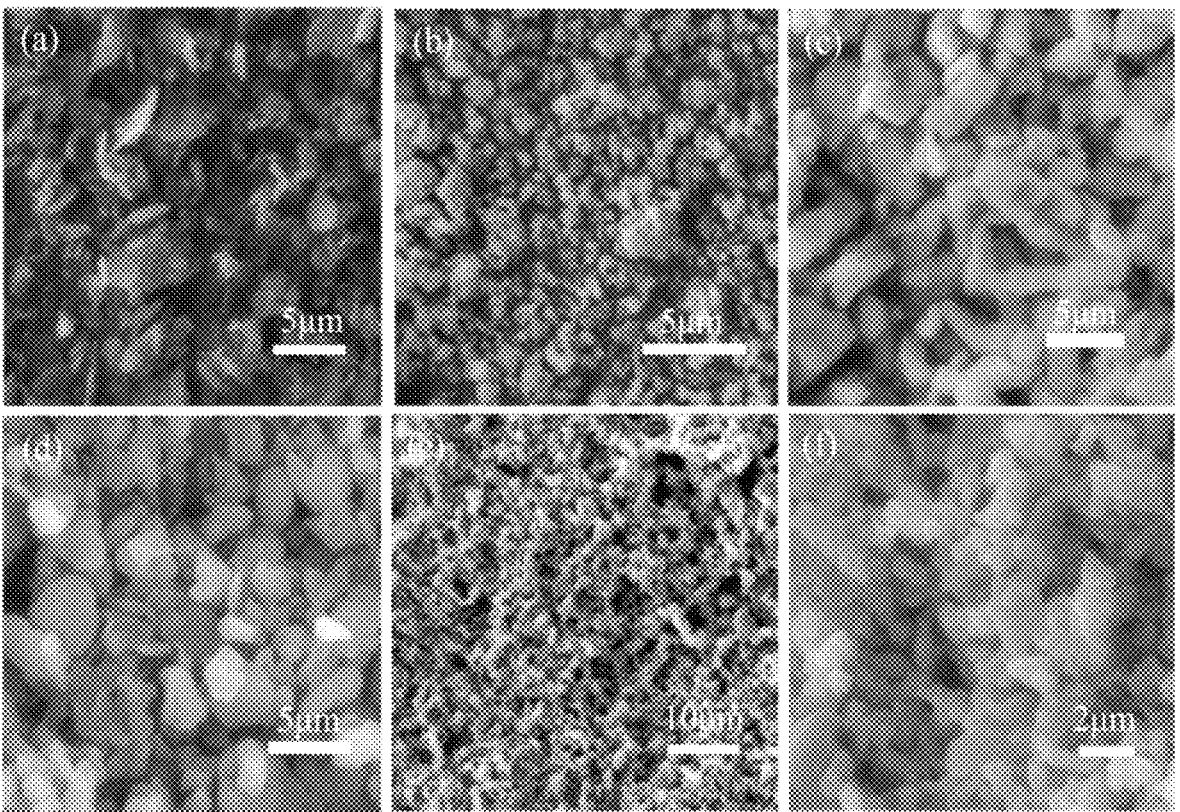

FIG. 4 depicts SEM micrographs of metakaolin (a), $SiO_2$ (b), $BaSO_4$ (c), PTFE (d), and AAGP coatings under 2000× magnification (e) and 10000× magnification (f).

Figure 5:
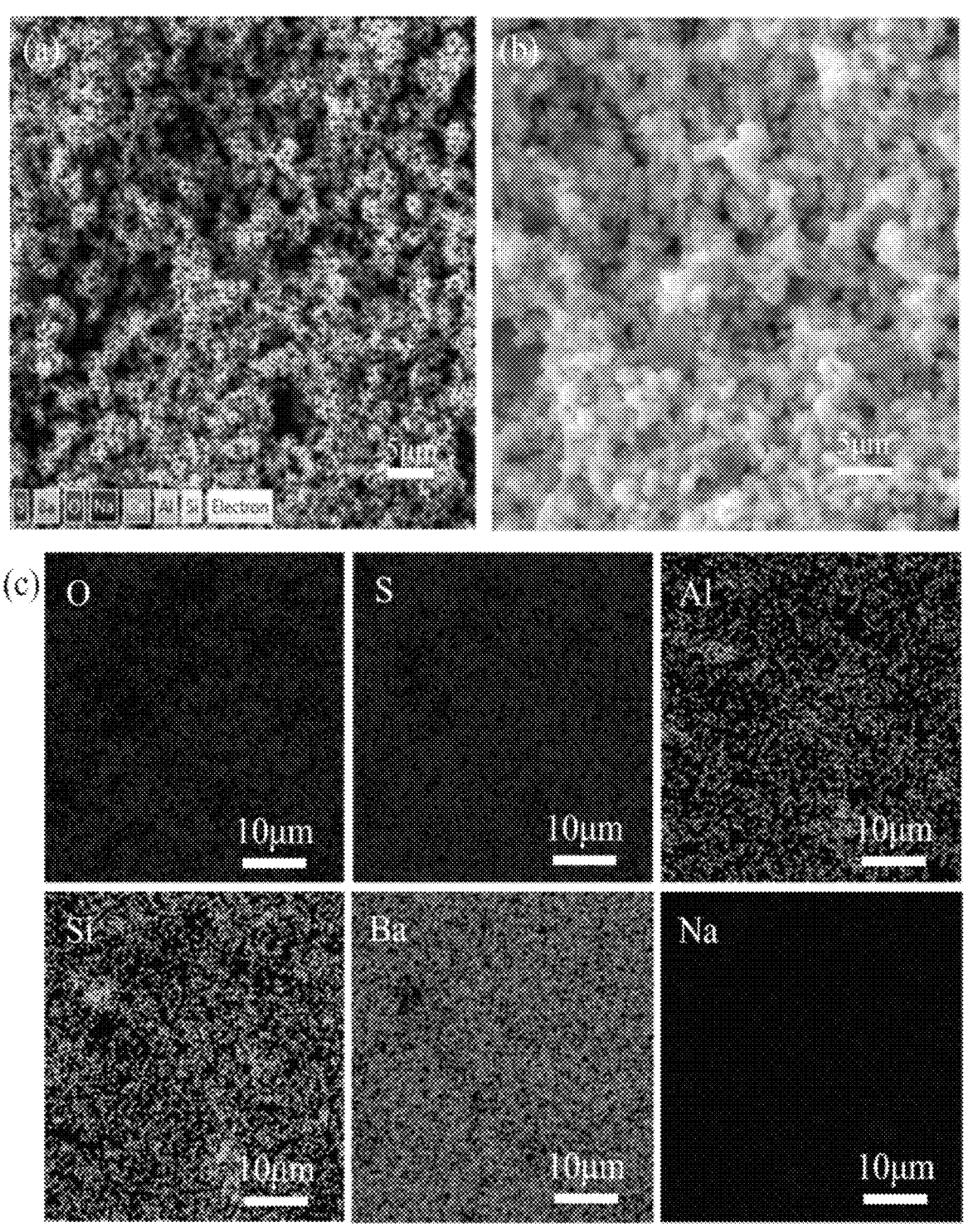

FIG. 5 depicts SEM image (a), SEM image (b) and elemental mapping (c) of section of the AAGP coating.

Figure 6:
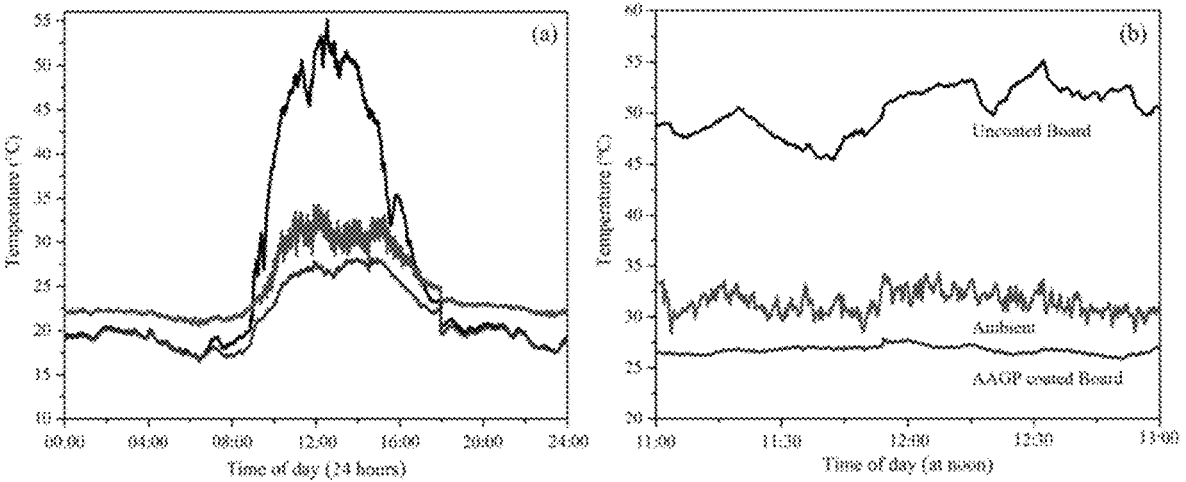

FIG. 6 depicts cooling performance of an (a) AAGP-coated board in comparison to an (b) uncoated board and the ambient temperature.

Figure 7:
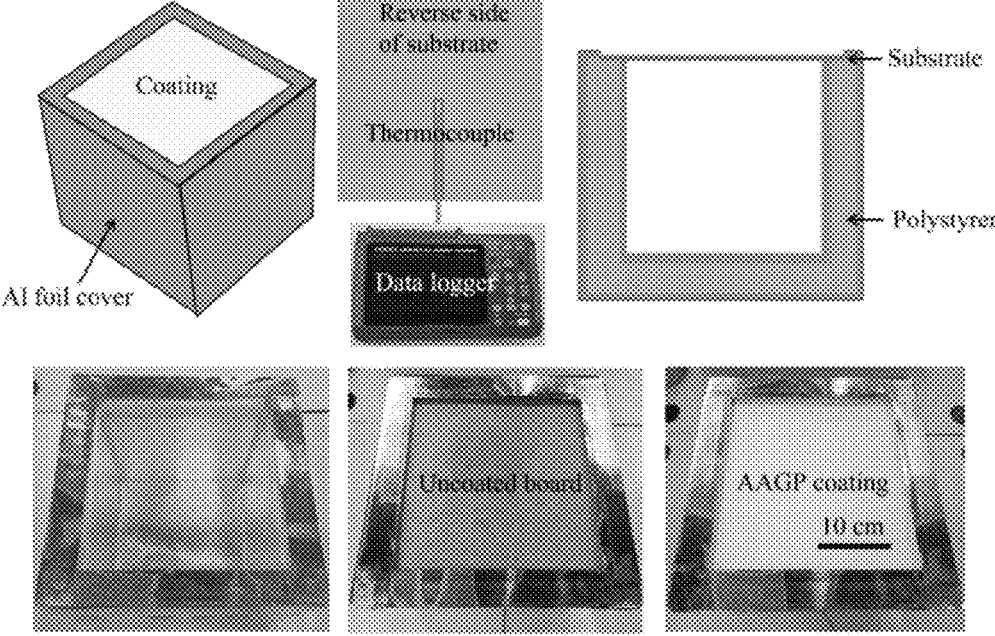

FIG. 7 Schematics and photos of the test setup for AAGP coating.

Figure 8:
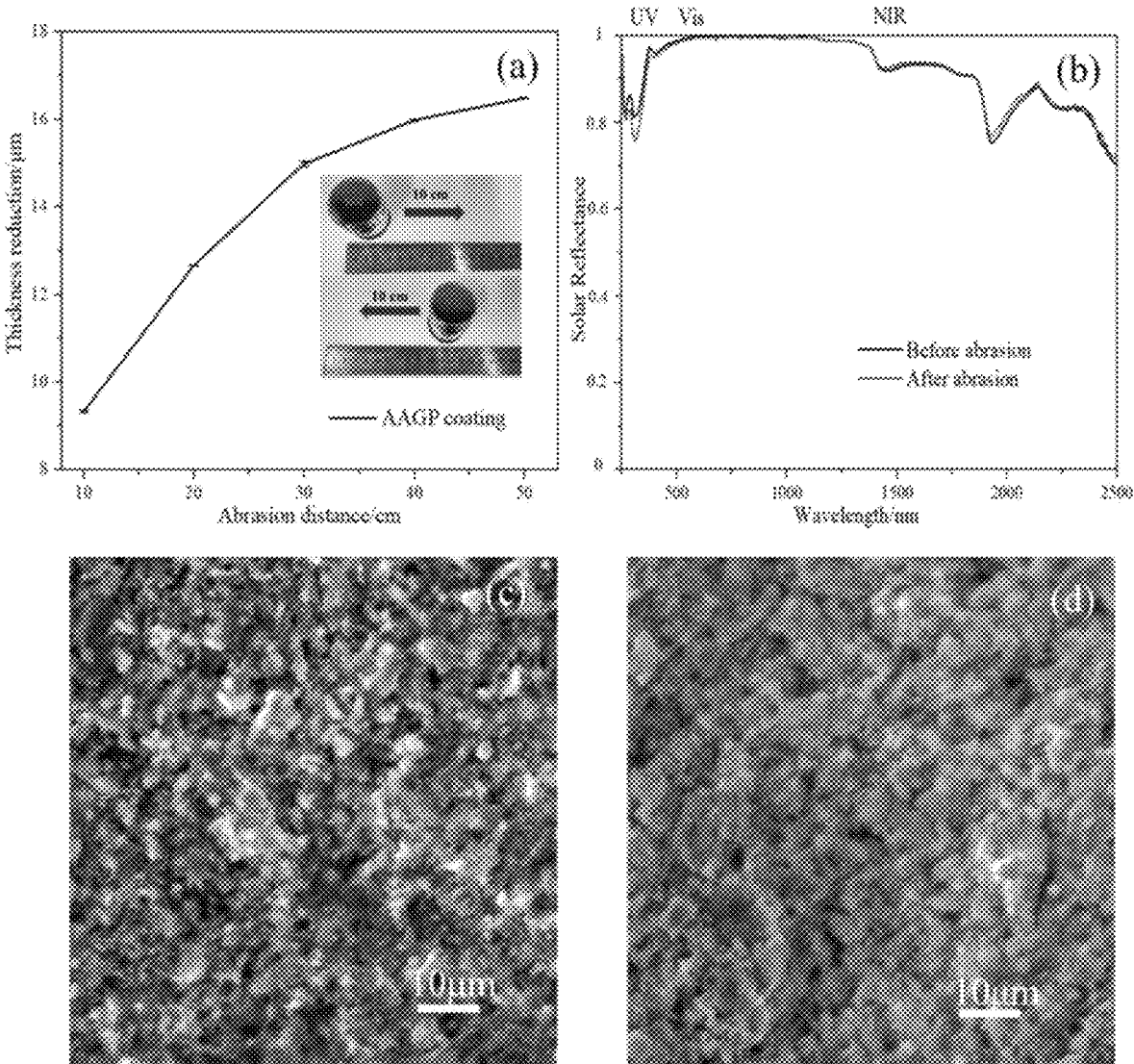

FIG. 8 The AAGP coating before and after the mechanical linear abrasion test: thickness reduction (a), solar reflectance (b) and SEM of the surface morphology of the coating before abrasion (c) and after abrasion (d).

Figure 9:
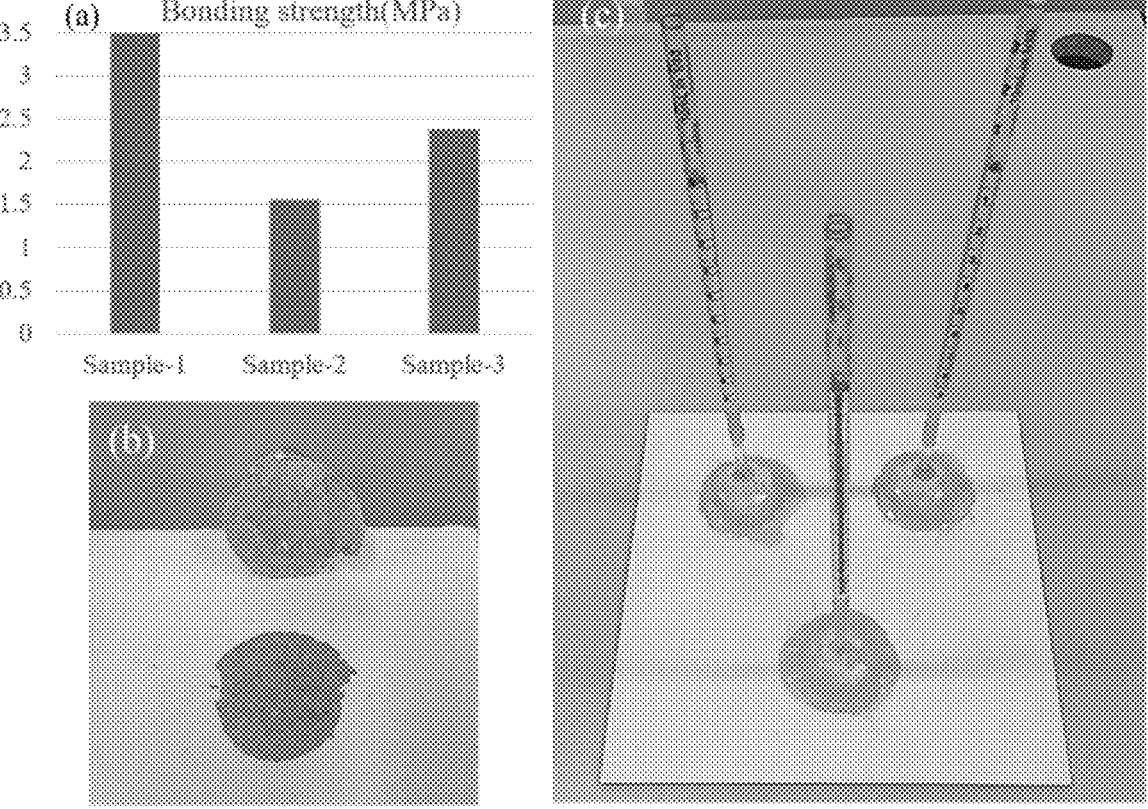

FIG. 9 Results of pull-out bond test (a), photos of the dolly used in the pull-out test (b) and photo of the water permeation test (c).

Figure 10:
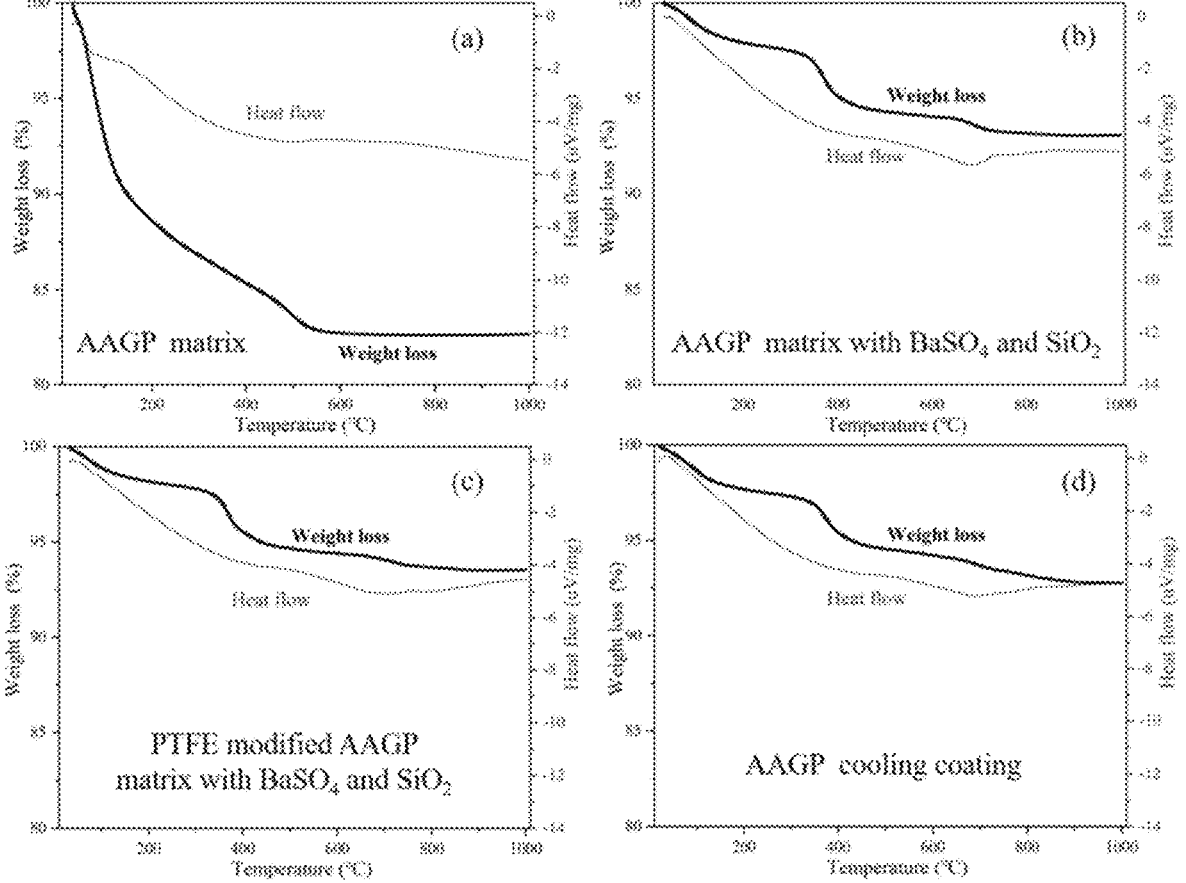

FIG. 10 TG-DTA thermograms of AAGP matrix (a) and AAGP coating (d) with different fillers (b and c) subjected to elevated temperature (from 30 to 1000° C.).

DETAILED DESCRIPTION

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

It should be understood that the order of steps or order for performing certain actions is immaterial so long as the present teachings remain operable. Moreover, two or more steps or actions may be conducted simultaneously.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10%, ±7%, ±5%, ±3%, ±1%, or ±0% variation from the nominal value unless otherwise indicated or inferred.

Provided herein is a SDRC coating useful for sub-ambient radiative cooling. The SDRC coating can comprise: an alkali activated metakaolin, $BaSO_4$, and silica nanospheres, wherein the alkali activated metakaolin is prepared by reaction of metakaolin with $SiO_2$ and $M_2O$, wherein M for each instance is independently Li, Na, or K.

Metakaolin ($Al_2Si_2O_7$) is a dehydration product of kaolinite ($Al_2(OH)_4Si_2O_5$), which can be produced by calcination of kaolinite.

Alkali activation of metakaolin involves the alkaline hydrolysis and dissolution of metakaolin and formation of a complex mixture of monomeric, dimeric, oligomeric oxide species, nucleation of the complex mixture and reprecipitation of aluminosilicate species.

Alkali activation of metakaolin can be accomplished by reacting metakaolin with an alkali activator comprising waterglass and a strong base, such as LiOH, NaOH, KOH, $Ca(OH)_2$, $Li_2O$ $Na_2O$, $K_2O$, CaO, or a mixture thereof. In certain embodiments, alkali activation of metakaolin is accomplished by reacting metakaolin with an alkali activator comprising waterglass and $M_2O$ or MOH, wherein M for each instance is independently Li, Na, or K and the waterglass comprises one or more metal silicate comprising a cation selected from the group consisting of Li, Na, K, and Ca. In certain embodiments, MOH is NaOH. In certain embodiments, metakaolin is activated by reaction with an alkali activator comprising waterglass comprising sodium silicate and NaOH in water.

Waterglass as used herein, can refer to an aqueous solution comprising one or more metal silicates selected from the group consisting of lithium silicate, sodium silicate, potassium silicate, calcium silicate, and mixtures thereof. In certain embodiments, waterglass comprises sodium silicate. Waterglass is available commercially or can be prepared directly by combining one or more metal silicates with water.

Waterglass can have a modulus value between 1-5, 2-5, 2.5-5, 3-5, 3-4.5, 3-4, 3-3.5, 1.5-4.5, 1.5-4, 1.5-3.5, 2-3.5, or 2.5-3.5. In certain embodiments, the modulus value of the waterglass is about 3.2.

The solid content of the waterglass can range from 20-50%, 20-40%, or 30-40%. In certain embodiments, the waterglass has a solid content of about 34.2%.

The alkali activator can have a solid content of 10-70%, 10-60%, 10-50%, 10-40%, 20-50%, 20-40%, 30-40%, 35-40%, 20-60%, 30-50%, 35-45%, or 40-45%. In certain embodiments, the alkali activator has a solid content of about 38.5% or about 40.7%.

The alkali activator can have a modulus value between 1-4, 1-3.5, 1-3, 1-2.5, 1-2, or 1-1.15. In certain embodiments, the alkali activator has a modulus value of about 1.23.

The mass ratio of the solid content of the alkali activator to metakaolin can range from 10:1 to 1:10, 5:1 to 1:5, 4:1 to 1:4, 3:1 to 1:3, 2:1 to 1:2, 3:2 to 1:2, 3:2 to 2:3, 4:5 to 5:4, or 11:10 to 10:11, respectively. In certain embodiments, the mass ratio of the solid content of the alkali activator to the metakaolin is about 77 to about 80, respectively.

The SDRC coating can comprise $BaSO_4$ at a concentration of 50-70 wt %, 60-70 wt %, 63-70 wt %, or 60-63 wt %. In certain embodiments, the SDRC coating comprises $BaSO_4$ at a concentration of about 60 wt %.

The SDRC coating can comprise the silica nanospheres at a concentration of 0.5-2.5 wt %, 1.0-2.5 wt %, 1.5-2.5 wt %, 2.0-2.5 wt %, 0.5-2.0 wt %, 0.5-1.5 wt %, 1.0-1.5 wt %, or 1.5-2.0 wt %. In certain embodiments, the SDRC coating comprises the silica nanospheres at a concentration of about 1.5 wt %.

The silica nanospheres can have an average diameter of 10-300 nm, 10-250 nm, nm, 10-150 nm, 10-100 nm, 10-90 nm, 10-80 nm, 10-70 nm, 10-60 nm, 10-50 nm, 20-50 nm, 20-40 nm, or 25-35 nm. In certain embodiments, the silica nanospheres have an average diameter of about 30 nm. In certain embodiments, the silica nanospheres are monodisperse.

The SDRC coating can optionally comprise one or more additives selected from the group consisting of polytetrafluoroethylene, $Ca(OH)_2$, $MgF_2$, $BaTiO_3$, light-weight lime, and ground lime. The one or more additives can be present in the SDRC coating at a concentration between 1-10 wt %, 1-9 wt %, 1-8 wt %, 1-7 wt %, 1-6 wt %, 1-5 wt %, 1-4 wt %, 1-3 wt %, 1-2 wt %, 2-10 wt %, 3-10 wt %, 4-10 wt %, 5-10 wt %, 6-10 wt %, 5-10 wt %, 6-10 wt %, 7-10 wt %, 8-10 wt %, 9-10 wt %, 2-9 wt %, 3-8 wt %, 4-6 wt %, 4-5 wt %, or 5-6 wt %.

The SDRC coating may be applied to a surface of a substrate by deposition of a SDRC coating formulation comprising the SDRC coating and water. The SDRC coating formulation may be a suspension, emulsion, or mixture. The SDRC coating formulation may comprise up to 40%, up to 35%, up to 30%, up to 25%, up to 20%, up to 15%, up to 10%, or up to 5% by weight water. In certain embodiments, the SDRC coating formulation comprises 5-40%, 10-40%, 15-40%, 20-40%, 20-35%, 25-35%, or 25-30% by weight water.

The SDRC coating can exhibit a solar reflectance of 0.9667-0.9758, 0.9633-0.9758, 0.9719-0.9758, or 0.9722-0.9758, between 100-2,500 nm. In certain embodiments, the SDRC coating exhibits a solar reflectance of about 0.9758.

The SDRC coating can exhibit an infrared emissivity of 0.90-0.9491, 0.91-0.9491, 0.93-0.9491, or 0.95-0.9491 between 8-13 μm. In certain embodiments, the SDRC exhibits an infrared emissivity of about 0.9491.

The present disclosure also provides a method of applying the SDRC coating formulation to a surface of a substrate, the method comprising: applying the SDRC coating formulation to the surface of the substrate thereby forming a SDRC coating on the surface of the substrate; and removing at least a portion of the water from the SDRC coating thereby causing the SDRC coating to harden.

The SDRC coating formulation can be applied to a wide variety of surfaces such as, for example, the surface of substrates composed of paper, wood, concrete, cement, asphalt, metal (e.g., streel, aluminum alloy, etc), glass, gypsum, ceramic, ceramic tiles, plastic, plaster, masonry, resin, and roofing substrates such as asphaltic coatings, roofing felts, foamed polyurethane insulation; or to previously painted, primed, undercoated, worn, or weathered substrates. In certain embodiments, the SDRC coating formulation is applied to the exterior walls and/or roof of a commercial, industrial, or residential building.

The SDRC coating can further comprise a water-proof layer disposed on a surface of the SDRC coating, which can enhance the water-resistance of the coated SDRC coating. In certain embodiments, the water-proof layer comprises a silane coupling agent, such as γ-aminopropyltriethoxy silane, γ-epoxypropyl triethoxyl silane, γ-glycidoxy butyl trimethoxy silane, glycidyl oxy methyl triethoxyl silane, and mixtures thereof.

EXPERIMENTAL

Materials

The inorganic geopolymer coating was made from metakaolin (i.e., the precursor material) and alkali activator solution (AA) which was prepared by mixing water, sodium hydroxide, and waterglass (with modulus 3.2 and solid content of 34.2%). The Venator BLANC FIXE N-type nano-precipitated barium sulphate (BaSO$_4$, 1 µm) and monodispersed silica nanosphere (nano-SiO$_2$, 99.5%, 30±5 nm) were used to improve the reflectance and infrared emission. Polytetrafluoroethylene (PTFE DISP 33, fluoropolymer resin) was used as a lubricant additive to improve the film formability and calcium hydroxide powder (Ca (OH)$_2$) in analytical grade was used to increase the early strength under ambient curing. Magnesium fluoride (MgF$_2$, AR, 3 µm, Sinopharm Chemical Reagent Co. Ltd.); barium titanite (BaTiO$_3$, AR, 200 nm RHAWN Chemical Co. Ltd.); light-weight lime (light calcium carbonate, CaCO$_3$, AR, 1 µm, Xilong Scientific Co., Ltd) and ground lime (heavy calcium carbonate, CaCO$_3$, AR, 2 µm, Tianjin Kemiou Chemical Reagent Co., Ltd.) were selected for optical performance comparison. The modified silane coupling agent (KH-800, Hangzhou Jessica Chemical Co. Ltd.) was used for hydrophobic treatment of the developed coating for improving the waterproofing property and durability.

Example 1—Synthesis of Geopolymer Coating

The alkali activator (AA) was prepared with the molar ratio (i.e., SiO$_2$/Na$_2$O) of 1.2 and solid content of 38.5%. 50 g AA was firstly added to a beaker, and then 20 g MK and about 25 g zirconium grinding beads were added into the beaker for mixing and stirring. During the stirring process, 20 g water, 3 g SiO$_2$, 70 g BaSO$_4$ and 10 g PTFE emulsion were added in order. The mixture was then stirred at 1200 rpm for 20 minutes. Afterwards, 1.5 g Ca(OH)$_2$ was added into the beaker with stirring for 2 min. The final product, alkali activated geopolymer (AAGP) slurry was then obtained by removing the zirconium grinding beads through filtering. The coating was then sprayed onto a standard fiber cement board substrate with the dimensions of 300 mm×300 mm×4 mm, (GB/T 9271-2008) using a spray gun with pressure of 5 MPa for about 50 s and the operation was repeated in approximately 3 min. The thickness of the above coating film after drying was at 500±50 µm as measured by a micrometers thickness gauge. Finally, the sample surface was treated with silane coupling agent KH-800 solution (diluted to 20% in ethanol) for hydrophobic treatment before field tests and durability tests.

Example 2—Optical Measurements

The solar absorbance, reflectance, and transmittance of the developed AAGP coatings were measured in accordance with ASTM E903-12, for which a PerkinElmer Lambda 1050+UV/VIS/NIR Wide Band Spectrometer equipped with an integral sphere was employed. The infrared emissivity of AAGP coatings was measured using a FTIR spectrometer (Vertex 70, Bruker).

Example 3—Material Characterization

To analyze the physicochemical properties of both raw materials (i.e., metakaolin, BaSO$_4$, nano silica, PTFE and Ca(OH)$_2$) and the formed AAGP coatings (i.e., with different fillers), XRD and FTIR analysis were conducted. XRD tests were performed to figure out the materials' crystallographic structures on a Bruker D8 ADVANCE A25X X-ray Diffractometer (Bruker AXS Ltd., Germany); FTIR spectroscopy was tested on a Thermo Fisher Nicolet iS10 FTIR spectrophotometer (Thermo Fisher, Germany) to analyze the functional groups and corresponding characteristic peaks. To further identify the microstructural properties and elemental distributions in the AAGP cooling coating, SEM and EDS were examined using TESCAN VEGA3 (TESCAN ORSAY HOLDING, Kohoutovice, Brno). It should be noted that only the optical tests were conducted for all the formed AAGP coatings while the other above-mentioned material characterization tests were conducted only for the AAGP coatings with the optimal contents of BaSO$_4$ and SiO$_2$ (which were respectively determined as 60 wt % and 1.5 wt % based on the prior optical tests as discussed in the latter sessions).

Example 4—Field Test

To evaluate the cooling performance, the AAGP cooling coating was prepared on a standard fiber-reinforced cement board and then hydrophobically treated with silane coupling agent KH-800 for long-lasting maintenance of optimal properties. The real-time surface temperatures of uncoated board and AAGP coated boards were recorded using a multichannel temperature collector (MEMORY HiLOGGER LR8431-30, HIOKI, E. E. Co. Ltd.). Thermocouple wires, KPS-TT-K-24-SLE-100 were purchased from Tianjin KAIPUSEN Heating & Cooling Equipment Co., Ltd. A mini weather station (Beijing Top Flag Technology Co., Ltd.) was installed for air temperature and humidity data collection.

Example 5—Durability Test

The linear abrasion test of AAGP coatings was carried out on standard sandpaper (320 mesh) with a 500 g abrading load to compare the solar reflectance performance and microscopic appearance of the coating surface before and after the abrasion. The water permeability test of AAGP coating was carried out according to standard of Japan Society of Civil Engineers JSCE-K571-2004. The pull-off tests of AAGP coatings were carried out with specially designed equipment (PosiTest® AT-M Adhesion Tester) according to ASTM D4541. The size of the dolly used was 20 mm in diameter. All the above tests were carried out at room temperature. To determine the thermal stability and compositions of AAGP coating with different fillers, TGA tests were conducted on a Rigaku Thermo Plus EVO2 Thermalgravimetry Analyser.

Example 6—Optical Performance

Figure 1:
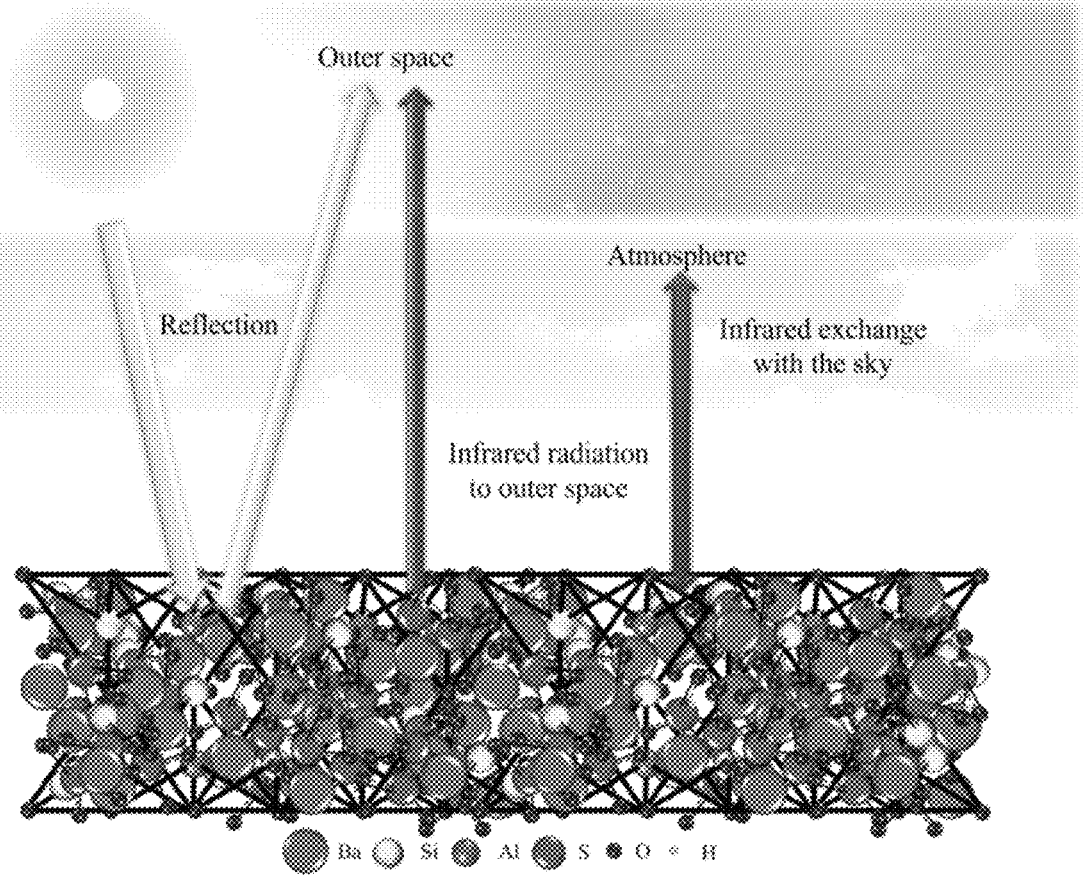
FIG. 1 depicts a schematic cooling mechanism of the geopolymer cooling coating.
Figure 2:
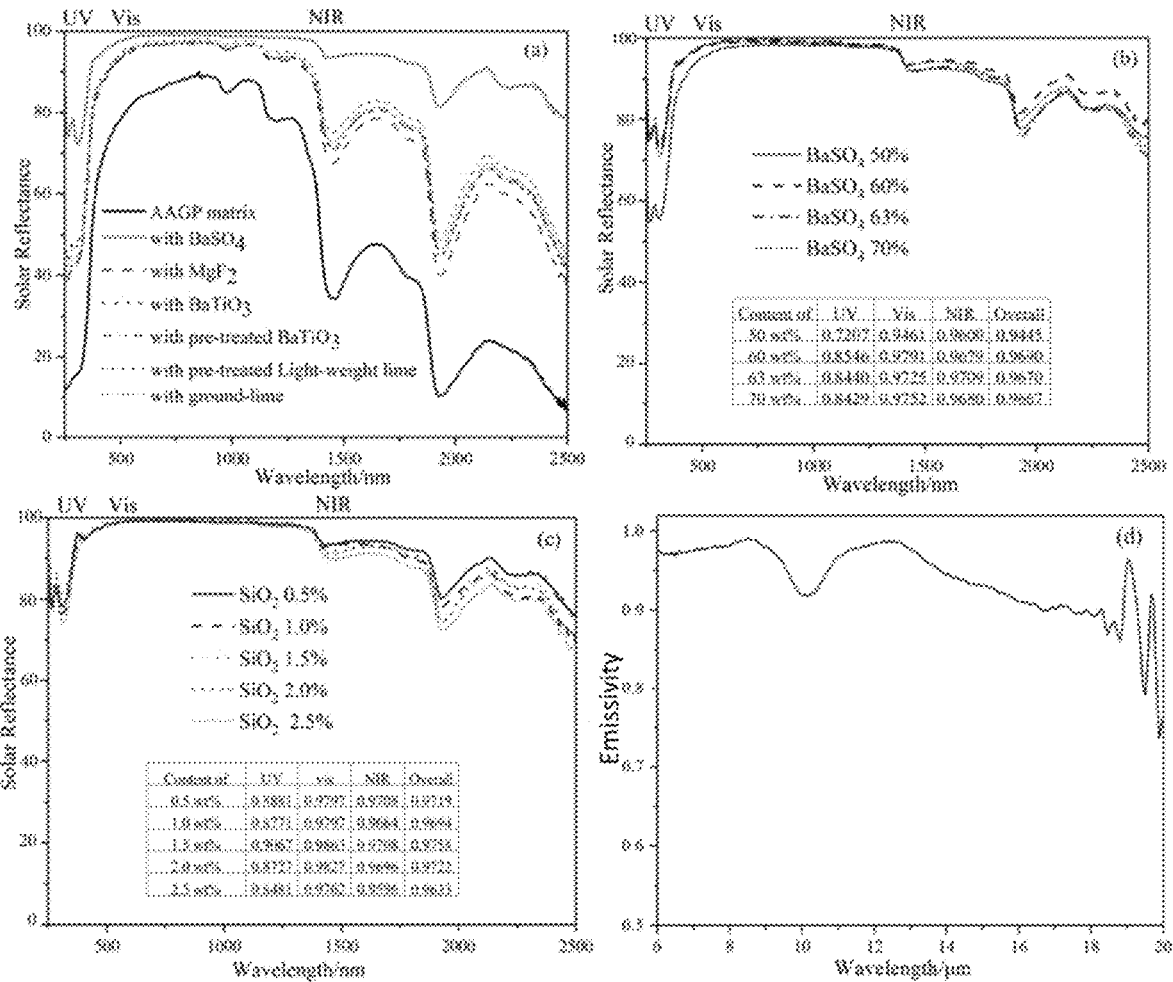
FIG. 2 depicts the optical properties of SDRC coating samples with different functional fillers. (a) Solar reflectance of AAGP matrix and AAGP coatings with different fillers. (b, c) Solar reflectance of AAGP coatings with varied addition ratio of $BaSO_4$ (b) and further modification of $SiO_2$ (c). (d) Infrared emissivity of the optimized AAGP cooling coating.

In order to achieve high radiative cooling performance and daytime sub-ambient cooling, the coating needs to meet two conditions as follows:
(1) minimizing the absorption from the solar spectrum (high solar reflectance).
(2) maximizing the emissivity at the atmospheric window (high emittance in the wavelength of 8 to 13 µm).
Similar to the previously reported strategies for boosting the solar reflectance and infrared emissivity of a polymeric coating, nano-sized functional fillers were utilized to modify the optical performance of AAGP coating. Nano-SiO$_2$ was chosen to improve the infrared emissivity. For solar spectrum, hierarchical air pores were formed in the geopolymer matrix that can introduce gentle light scattering. Moreover, other types of powders were added into the AAGP matrix to further facilitate multiple Mie scattering of sunlight. Semiconductors with large bandgap and high refractive index are favored for efficient scattering.
FIG. 2a shows the measured solar reflectance of the formed AAGP geopolymer coatings modified with commonly used white wide band gap materials including BaSO$_4$; MgF$_2$; BaTiO$_3$; light-weight lime and ground lime.

To avoid agglomeration of $BaTiO_3$ powders and to avoid coagulation of light-weight lime, they were pre-treated with ethanol dissolved KH-800 silane coupling agent (the powders were immersed in KH-800 solution and then oven dried at 80° C. for one hour). Table 1 summarizes the reflectance of different coatings integrated in different spectral regions (i.e., UV region, VIS region and NIR region) and the resultant overall reflectance. It can be observed that, comparing to other white materials, $BaSO_4$ enabled the AAGP coating with the highest reflectance in the UV range (0.8546) as well as a remarkable overall solar reflectance of 0.9690. Therefore, in spite of the difference existing between the polymeric and inorganic matrix, the dielectric contrast near geopolymer-air, geopolymer-$BaSO_4$ and air-$BaSO_4$ interfaces can efficiently introduce multiple Mie scattering and thus improves the overall solar reflectance.

TABLE 1

Solar reflectance of AAGP coating with different additives in different spectral regions.

| Sample | UV | Vis | NIR | Overall |
|---|---|---|---|---|
| AAGP Matrix | 0.3429 | 0.8076 | 0.7364 | 0.7620 |
| AAGP Matrix with $BaSO_4$ | 0.8546 | 0.9791 | 0.9679 | 0.9690 |
| AAGP Matrix with $BaTiO_3$ | 0.6694 | 0.9292 | 0.9023 | 0.9064 |
| AAGP Matrix with pre-treated $BaTiO_3$ | 0.6419 | 0.9238 | 0.9016 | 0.9025 |
| AAGP Matrix with pre-treated light-weight | 0.6716 | 0.9357 | 0.9165 | 0.9165 |
| AAGP Matrix with ground lime | 0.6511 | 0.9259 | 0.9058 | 0.9058 |

Further research was conducted to investigate how the addition ratio of $BaSO_4$ in the AAGP matrix influences the solar reflectance the coating. Four different addition ratios of $BaSO_4$ varying from 50 w % to 70 w % were selected. It is shown that as the addition ratio of $BaSO_4$ increases, the solar reflectance of the AAGP coating increases first and then decreases (see FIG. 2b), with the maximum value overall reflectance reached at 60 wt % (i.e., 0.969). At the optimized addition ratio of $BaSO_4$ (i.e., 60 wt %), different amounts of nano-$SiO_2$ particles (0% to 2.5% of the matrix by weight) with high infrared emissivity were further added into the matrix to assist scattering. It is shown in FIG. 2c that addition of 1.5 wt % nano-$SiO_2$ particles led to the best overall reflectance performance (i.e., 0.9758).

FIG. 2d presents the measured spectral response of the thermal infrared (6-20 μm) emissivity of the optimized AAGP cooling coating (i.e., with 60% $BaSO_4$ and 1.5% $SiO_2$). It is shown that the infrared emissivity both in and out of the sky window (8-13 μm) was very high (0.9491). This high emissivity was attributed to the alumino-silicate network of geopolymer (—Si—O—Al(Si)—O—).

Example 7—Materials Characterizations

Example 8—XRD Spectrum and FT-IR Spectrum

As shown in FIGS. 3a and 3b, the characteristic peaks of the raw materials of the coating and the changes in crystal structure after the coating formation were analyzed by XRD tests. The characteristic peaks of metakaolin include broad dispersion peaks with low intensity between 20° and 28.4°, indicating the mixed semi-crystalline and amorphous structure with strong reactivity, which facilitated the formation of geopolymer. The results show that the siloxane and aluminoxane tetrahedral structures in metakaolin disappeared to form three possible complex structural morphologies (—Al—O—Al—, —Si—O—Si— or —Si—O—Al— chains), which are presented as phase shifts in FIG. 3b.

The diffraction peaks of $BaSO_4$ are relatively sharp, indicating good crystallinity, high purity, and a hexagonal crystal structure (JCPDF file no. 24-1035). The characteristic peaks of $BaSO_4$ can also be clearly observed after being added into AAGP matrix, as shown in FIG. 3b, which is a major function part of the cooling coating. The small amount of PTFE provided a small sharp characteristic peak at 18.5° (JCPDF file no. 54-1595) in the AAGP coating (FIG. 3b). Addition of $Ca(OH)_2$ hardly changed the crystalline structure of the AAGP coating.

The functional groups of the raw materials and AAGP coating with different fillers were investigated through FTIR analysis, as shown in FIGS. 3c and 3d. The major characteristic peak of metakaolin locates at 1068 $cm^{-1}$ is in association with the Si—O asymmetric vibration. However, it shifts to 1060 $cm^{-1}$ in the geopolymer matrix, which can be attributed to the partial replacement of $[SiO_4]$ tetrahedra by $[AlO_4]$ tetrahedra that alters the local chemical environment of the Si—O bond. The characteristic bands centered at 798 $cm^{-1}$ and 777 $cm^{-1}$ in the metakaolin spectra are attributed to the stretching and bending vibrations of the six-coordinated Al—O, which is a highly reactive component of the metakaolin. These two peaks changed to one moderate peak at 784 $cm^{-1}$ after geopolymerization, which is the vibration of unit of the geopolymer structure Si—O—Al or Si—O—Si. The above intensive peaks (at 9.434 μm and 12.76 μm) in the infrared atmospheric window contributed to the high emissivity of the geopolymer matrix. The characteristic bands of $BaSO_4$ nanoparticle centered at 1060 $cm^{-1}$ and the shoulder at 984 $cm^{-1}$ were assigned to symmetric stretching vibration of $SO_4^{2-}$ group. The peaks obtained at 637 and 603 $cm^{-1}$ were attributed to the out-of-plane bending vibration of the $SO_4^{2-}$. As the $BaSO_4$ content exceeds half of the total content, most of the peaks of the AAGP cooling coating exhibited its characteristic peaks.

Example 9—SEM and Element Mapping Results

The microscopic surface morphology of raw materials and AAGP coatings are shown in the FIG. 4. It is seen that the three-dimensional geopolymer matrix formed the scaffold that bound up the $BaSO_4$ flakes and silica nanospheres, forming a surface morphology of intermingled micro-/nano-bulges and pores. Interestingly, hierarchical air pores were observed in the AAGP matrix, which is beneficial for enhancing solar reflectance.

The element mapping of the coating surface was obtained by EDS analysis for which show the evenly distributed different chemical elements in the analyzed sample (FIG. 5).

Example 10—Field Cooling Performance Tests

The device (details are shown in Field Test Apparatus and FIG. 7) was placed on a flat building roof under direct sunlight on Nov. 13, 2021, in Hong Kong. The relative humidity was recorded stably at around 40%. The average wind speed was 3 m s$^{-1}$. FIG. 6a shows the variations of the ambient temperature and the surface temperatures of coated and uncoated cement boards within 24 hours and FIG. 6b shows the enlarged view during noon time (i.e., 11:00 am to 13:00 pm). It is shown that the surface temperature of AAGP coating was consistently lower than the ambient temperature at daytime.

The detailed average temperature data of the uncoated board ($T_b$), AAGP coating (T), and the ambient environment ($T_a$) are presented in Table 2. The results show that the AAGP coating could achieve an average temperature reduction of 4.09° C. and a maximum temperature reduction of 8.9° C. compared to the ambient (i.e., $T_a$-T), while the average and maximum temperature differences between AAGP coated and uncoated boards (i.e., $T_b$-T) were 5.54° C. and 24.30° C., respectively.

TABLE 2

Average temperatures of uncoated board and AAGP-coated board.

| Average (° C.) | $T_b$ | T | $T_a$ | $T_a$ – T | $T_b$ – T |
|---|---|---|---|---|---|
| 11 am to 1 pm | 32.79 | 22.07 | 25.77 | 3.70 | 10.72 |
| 12 am to 12 pm | 25.25 | 19.71 | 23.80 | 4.09 | 5.54 |

In addition, our AAGP coating exhibits excellent durability under abrasion, water permeability, pull-out and TGA tests (see Examples 12-14), indicating a superior alternative for long-term large-scale applications of radiative cooling coatings.

Example 11—Field Test Apparatus

The device shown in the FIG. 7 was used to compare the surface temperature difference between uncoated and coated cement boards. The as-prepared AAGP cooling coating (with the optimized mix proportions) was sprayed onto the surface of a cement board and exposed to sunlight after the hydrophobic treatment as previously mentioned. A polystyrene foam frame covered by aluminum foil was prepared to support and insulate the coated and uncoated boards. A thermocouple was installed beneath the boards (substrates) and a datalogger was used to collect the temperature data. The ambient temperature and humidity were recorded by the weather station.

Example 12—Results of Abrasion Tests

FIG. 8a compares the thickness reduction of the AAGP coating at different linear abrasion distances performed on the standard sandpaper (mesh no. 340) with the 500 g abrasion load. It is shown that the thickness reduction of AAGP coating was about 16 μm after 50 cm abrasion while such value is more than 40 μm for a typical polymeric commercial coating. Therefore, the AAGP coating exhibited an approximately the same or even better abrasion resistance than the commercial coating, indicating a better long-term anti-wear property. FIG. 8b shows the solar reflectance of the AAGP coating before and after abrasion. The results show that the overall reflectance marginally changed after the abrasion (from 0.9758 to 0.9726, see Table 3). FIGS. 8c and 8d show the microscopic surface morphology of the AAGP coating before abrasion and after abrasion, which indicates that the three-dimensional structure combining the bumps and pores was well retained after the wearing test, i.e., the excellent optical properties of AAGP coating was maintained.

Example 13—Results of Pull-Out Bond Test and Water Permeability Test

The adhesion property of AAGP coating to substrate is very important for its engineering application. FIG. 9a presents the adhesion test results. The average bonding strength of three tests was approximately 2.48 M/Pa although the deviation was quite large (with mean absolute deviation of 0.68) and the failure mode was the substrate failure (FIG. 9b), indicating a good adhesion property. The waterproof performance of the AAGP coating was evaluated by water permeability test according to standard of Japan Society of Civil Engineers JSCE-K571-2004. The AAGP coated and uncoated substrate were respectively tested under three funnel tubes, which were placed upside down on their surface and filled in with water (FIG. 9c). The amount of water reduction was recorded after 7 days for each funnel tube. The test results show that the AAGP cooling exhibited a 2.12 mg/day/cm$^2$ rate of water permeability as compared to the value of 3.9 mg/day/cm$^2$ reported for the typical commercial coating. Water in the funnel tube sealed on the uncoated substrate was all gone. Therefore, the AAGP coating exhibited excellent water resistance, which is essential for outdoor applications.

Example 14—Results of TGA Test

TGA test was conducted on AAGP coatings with different additives and the results are shown in FIG. 10. The AAGP matrix lost 12.5% of the weight at 200° C. and 17.5% at 600° C.; The AAGP matrix with BaSO$_4$ (60 wt %) and SiO$_2$ (1.5 wt %) lost 2.5% of the weight at 200° C. and 5% at 400° C.; PTFE modified AAGP matrix with BaSO$_4$ (60 wt %) and SiO$_2$ (1.5 wt %) lost 3% at 200° C. and 5% at 400° C.; PTFE modified AAGP matrix with BaSO$_4$ (60 wt %) and SiO$_2$ (1.5 wt %) with Ca(OH)$_2$ (i.e. AAGP cooling coating) lost 3% at 200° C. and lost 5% at 400° C. It can be concluded that the AAGP matrix with BaSO$_4$ (60 wt %) and SiO$_2$ (1.5 wt %) had an excellent high temperature resistance compared to the matrix without any functional filler. Addition of a relatively small amount of PTFE emulsion and Ca(OH)$_2$ just marginally affected the high temperature resistance, while they are very helpful in achieving a good workability of the coating.

TABLE 3

The solar reflectance of AAGP coating before and after abrasion test

| AAGP coating | UV | Vis | NIR | Overall |
|---|---|---|---|---|
| before abrasion | 0.9067 | 0.9863 | 0.9708 | 0.9758 |
| after abrasion | 0.8735 | 0.9813 | 0.9718 | 0.9726 |

An inorganic geopolymer-based daytime radiative cooling coating has been developed in this study, which is environment-friendly and can be formed and cured at room temperature. Based on a comprehensive experimental study program, the following conclusions have been arrived:

(1) The AAGP coating has achieved a high sky window emissivity of 0.9491 and 97.6% of solar reflectance mainly due to the addition of BaSO$_4$ and nano-SiO$_2$ particles and the hierarchical air pores formed in the AAGP matrix.

(2) The optimized AAGP coating could achieve a sub-ambient cooling effect up to 8.9° C. under direct sunlight.

(3) The developed AAGP coating could maintain well its performance after mechanical wearing and high temperature exposure and exhibits good waterproofing resistance.

(4) Due to the inherit advantages of an inorganic coating over its organic counterpart, the developed AAGP coating is expected to be able to broaden the applicability of the DRC technology for efficient thermal management and energy saving purpose.

What is claimed is:

1. A sub-ambient daytime radiative cooling (SDRC) coating composition comprising: an alkali activated metakaolin, $BaSO_4$, and silica nanospheres, wherein the alkali activated metakaolin is prepared by reaction of metakaolin with an alkali activator, wherein the alkali activator comprises waterglass and a strong base selected from the group consisting of LiOH, NaOH, KOH, $Ca(OH)_2$, $Li_2O$ $Na_2O$, $K_2O$, CaO, and a mixture thereof.

2. The SDRC coating composition of claim 1, wherein the SDRC has a solar reflectance of 0.9667-0.9758 between 100-2,500 nm.

3. The SDRC coating composition of claim 1, wherein the SDRC has an infrared emissivity of 0.90-0.9491 between 8-13 μm.

4. The SDRC coating composition of claim 1, wherein the $BaSO_4$ is present in the coating composition at 50-70 wt %.

5. The SDRC coating composition of claim 1, wherein the $BaSO_4$ is present in the coating composition at 60-63 wt %.

6. The SDRC coating composition of claim 1, wherein the silica nanospheres have an average diameter between 10-100 nm.

7. The SDRC coating composition of claim 1, wherein the silica nanospheres have an average diameter between 20-50 nm.

8. The SDRC coating composition of claim 1, wherein the silica nanospheres are present in the coating composition at 0.5-2.0 wt %.

9. The SDRC coating composition of claim 1, wherein the silica nanospheres are present in the coating composition at 1.5-2.0 wt %.

10. The SDRC coating composition of claim 1, wherein the $BaSO_4$ is present in the coating composition at 60-63 wt % and the silica nanospheres are present in the coating composition at 1.5-2.0 wt %.

11. The SDRC coating composition of claim 1, wherein the alkali activator comprises waterglass comprising sodium silicate and NaOH.

12. The SDRC coating composition of claim 11, wherein the waterglass has a modulus of 1-5.

13. The SDRC coating composition of claim 12, wherein the metakaolin and the alkali activator are combined in a mass ratio of metakaolin to a solid content of the alkali activator of 1:1 to 1.2:1, respectively.

14. The SDRC coating composition of claim 1, further comprising one or more additives selected from the group consisting of polytetrafluoroethylene, $Ca(OH)_2$, $MgF_2$, $BaTiO_3$, light-weight lime, and ground lime.

15. The SDRC coating composition of claim 2, wherein the alkali activator comprises waterglass comprising sodium silicate and NaOH, the waterglass has a modulus of 3-3.5, the metakaolin and the alkali activator are combined in a mass ratio of metakaolin to a solid content of the alkali activator of 1:1 to 1.1:1, respectively;

the $BaSO_4$ is present in the coating composition at 60-63 wt %;

the silica nanospheres have an average diameter between 20-50 nm;

the silica nanospheres are present in the coating composition at 1.5-2.0 wt %; and the SDRC has an infrared emissivity of 0.93-0.9491 between 8-13 μm.

16. A sub-ambient daytime radiative cooling (SDRC) coating formulation comprising the SDRC coating composition of claim 1 and water.

17. A method of applying the SDRC coating formulation of claim 16 to a surface of a substrate, the method comprising: applying the SDRC coating formulation to the surface of the substrate thereby forming a SDRC coating on the surface of the substrate; and removing at least a portion of the water from the SDRC coating.

* * * * *